(12) United States Patent
Holcomb

(10) Patent No.: US 9,112,806 B2
(45) Date of Patent: Aug. 18, 2015

(54) USER GUIDED GENERATION OF NETWORK LINK OPTIMIZATION PROFILES

(75) Inventor: Justin H. Holcomb, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 628 days.

(21) Appl. No.: 11/928,495

(22) Filed: Oct. 30, 2007

(65) Prior Publication Data
US 2009/0112562 A1    Apr. 30, 2009

(51) Int. Cl.
G06F 15/16 (2006.01)
G06F 15/173 (2006.01)
H04L 12/26 (2006.01)
H04L 29/08 (2006.01)
H04L 12/24 (2006.01)

(52) U.S. Cl.
CPC ............ H04L 43/50 (2013.01); H04L 12/2697 (2013.01); H04L 67/30 (2013.01); H04L 41/5009 (2013.01)

(58) Field of Classification Search
CPC . H04L 12/2697; H04L 43/50; H04L 41/5009; H04L 67/30
USPC ................................ 709/217–228
See application file for complete search history.

(56) References Cited

U.S. PATENT DOCUMENTS

| | | | |
|---|---|---|---|
| 4,539,222 A * | 9/1985 | Anderson et al. | 438/754 |
| 6,816,912 B1 | 11/2004 | Borella et al. | |
| 7,272,707 B2 * | 9/2007 | Liu et al. | 713/1 |
| 7,376,083 B2 * | 5/2008 | Ignatowski et al. | 370/232 |
| 7,490,234 B2 * | 2/2009 | Liu et al. | 713/1 |
| 2003/0120821 A1 | 6/2003 | Thermond et al. | |
| 2003/0182431 A1 | 9/2003 | Sturniolo et al. | |
| 2005/0132323 A1 * | 6/2005 | Huerta et al. | 717/100 |
| 2006/0067271 A1 | 3/2006 | Chen et al. | |
| 2006/0080658 A1 * | 4/2006 | Marion et al. | 717/177 |
| 2006/0233346 A1 * | 10/2006 | McIlwaine et al. | 379/265.02 |
| 2007/0087756 A1 * | 4/2007 | Hoffberg | 455/450 |
| 2007/0239700 A1 * | 10/2007 | Ramachandran | 707/5 |
| 2009/0031008 A1 * | 1/2009 | Elliott et al. | 709/220 |
| 2009/0112562 A1 * | 4/2009 | Holcomb | 703/20 |

OTHER PUBLICATIONS

Adampoulou, Evgenia, et al; Intelligent Access Network Selection in Heterogeneous Networks; Wireless Communication Systems, 2005. 2nd Int'l Symposium on Sep. 5-7, 2005, pp. 279-283.

(Continued)

*Primary Examiner* — Haresh N Patel
(74) *Attorney, Agent, or Firm* — Steven M. Greenberg, Esq.; CRGO Law

(57) ABSTRACT

Embodiments of the present invention address deficiencies of the art in respect to optimization profile generation and provide a method, system and computer program product for user guided generation of network link optimization profiles. In one embodiment of the invention, a network optimization profile generation method can be provided. The method can include ranking different performance criterion for a target network, testing the target network for the different performance criterion, weighting results of the testing according to the ranking of the different performance criterion, generating a set of target network configuration parameters through optimization of the weighted results, for instance simulated annealing, and applying the set of target network configuration parameters to the target network as a profile.

16 Claims, 2 Drawing Sheets

(56) References Cited

OTHER PUBLICATIONS

Murray, Ken, et al; Intelligent Access and Mobility management in Heterogeneous Wireless Networks Using Policy; ACM Int'l Conference Proceeding Series; vol. 49; Proceedings of the 1st Int'l Symposium on Information and Communication Technologies, pp. 181-186, Dec. 31, 2003.

Ormond, Olga, et al; Network Selection Strategy in Heterogeneous Wireless Networks; IT&T Conference, Cork, Ireland, Oct. 2005, pp. 175-184.

IBM TDB 01-94, v. 37, n1, pp. 509-514; Method for Efficiently Providing Different Levels of Network Availability in High-Speed Networks.

* cited by examiner

USER GUIDED GENERATION OF NETWORK LINK OPTIMIZATION PROFILES

BACKGROUND OF THE INVENTION

1. Field of the Invention

The present invention relates to the field of network connectivity for roaming mobile end users and more particularly to the field of network optimization profile generation in performance optimizing network connections during roaming.

2. Description of the Related Art

In a mobile computing environment, it is often required that users be allowed to connect to computing resources over a variety of types of network technologies with minimal disruption of the application environment. Virtual private network (VPN) tunneling enables mobile users to connect to different computing resources from remote locations, as a VPN can provide a tunnel for passing traffic to a backend network through an application-transparent virtual connection. Advantageously, VPN tunneling can support roaming in which an established VPN tunnel can switch from one physical network to another seamlessly so that client applications remain connected as the VPN tunnel switches between physical networks.

In this regard, roaming involves switching between physical networks while keeping the VPN tunnel open and undisrupted. Yet, because the performance characteristics of each different physical network may vary widely, for each virtual connection it is preferred to optimize the manner in which the traffic is handled for each physical network as much as possible. To with, performance optimization includes adjusting connectivity settings such as compression levels, header reduction, packet buffering and packet joining, and transport control protocol (TCP) retransmission suppression.

Performance optimization for each different physical connection can be expressed in a network optimization profile in which preconfigured sets of optimization settings can be stored for application to a VPN tunnel at connection time or roam time based upon the physical network from which a roaming device connects. Still, very often it can be difficult for the operator of the virtual network to obtain a properly configured optimization profile. In this regard, network optimization profiles ordinarily are manually created either in a lab environment by the vendor of the virtual network, or in the field by the operator of the virtual network. In the former circumstance, the efficacy of a generated network optimization profile is limited to the physical network represented in the lab environment and not in the field. In the latter circumstance, a level of expertise can be lacking.

Consequently, successfully deployed network optimization profiles tend to be tuned for general performance rather than for the specific application needs of the virtual network operator. To the extent that the end user attempts to tune the optimization profile to meet the specific needs of the field, the end user tends to lack enough specialized expertise necessary to create optimization profiles for each carrier network that may be serviced by the virtual network, for example a virtual network serving 802.11, code division multiple access (CDMA), and a non-Internet protocol (IP) Mobitex network, that it is common for the end user to degrade network performance by mis-configuring the optimization settings of the profile during manual tuning.

BRIEF SUMMARY OF THE INVENTION

Embodiments of the present invention address deficiencies of the art in respect to optimization profile generation and provide a novel and non-obvious method, system and computer program product for user guided generation of network link optimization profiles. In one embodiment of the invention, a network optimization profile generation method can be provided. The method can include ranking different performance criterion for a target network, testing the target network for the different performance criterion, weighting results of the testing according to the ranking of the different performance criterion, generating a set of target network configuration parameters through optimization of the weighted results, for instance simulated annealing, and applying the set of target network configuration parameters to the target network as a profile.

In another embodiment of the invention, a network optimization profile generation data processing system can be provided. The system can include a test device configured for coupling to a target network. The test device can include a test suite and a set of tests each directed to a different network performance criterion for the target network. The system also can include a profile generation engine configured for communicative coupling to the test device over the target network. The engine can include program code enabled to iteratively apply a profile of network configuration parameters to the target network, to signal the test device to initiate testing of the target network, and to receive test results from the test device. Finally, the system can include simulated annealing logic coupled to the profile generation engine. The logic can include program code enabled to generating a profile of network configuration parameters through simulated annealing of weighted ones of the test results.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for user guided generation of network link optimization profiles. In accordance with an embodiment of the present invention, an optimization profile for a target network can be generated in an iterative fashion according to the prioritization of performance factors for the target network as specified by an end user. In particular, a test suite in the target network can iteratively test the target network using parameters suggested by a profile generation engine according to weights assigned by the end user in respect to prioritized network performance criteria. The parameters can be computed according to the weights provided by the end user and the results of the tests as applied to an optimization algorithm, for instance a simulated annealing algorithm. In this way, the target network can be configured in an automated fashion according to the performance criteria most important to the end user.

Figure 1:
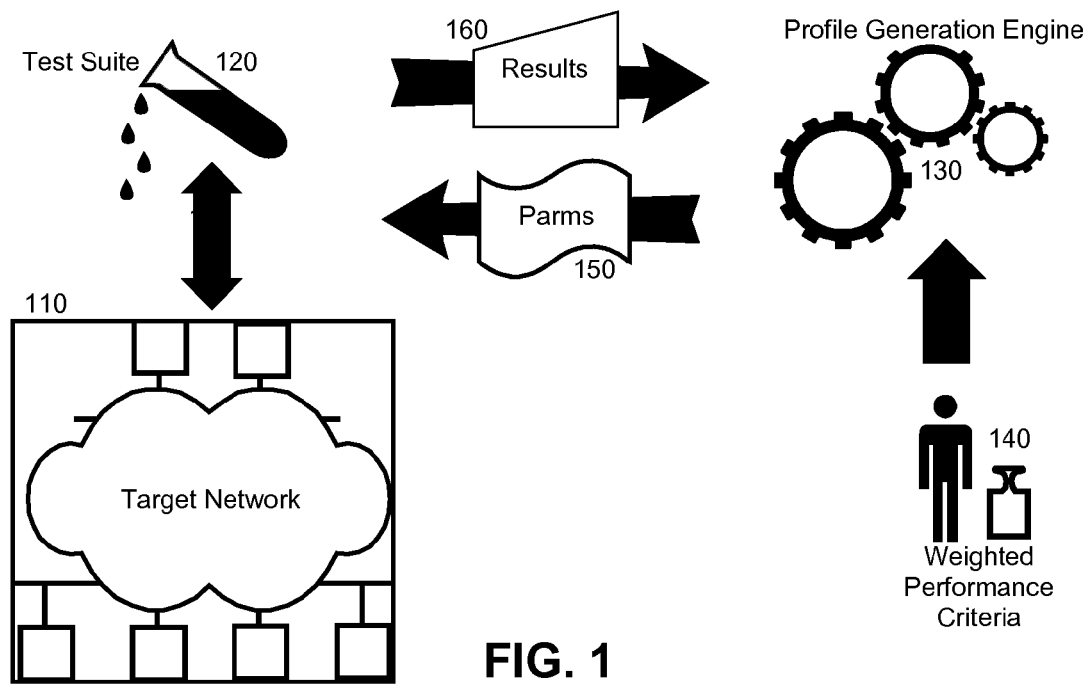
FIG. 1 is a pictorial illustration of a process for user guided generation of network link optimization profiles.

In illustration, FIG. 1 pictorially depicts a process for user guided generation of network link optimization profiles. As shown in FIG. 1, weighted performance criteria 140 can be defined by an end user for a target network 110 and provided to a profile generation engine 130 in the creation of an optimized network configuration profile 150. The weighted performance criteria 140, for example, can include a set of weights each applied to a different aspect of network performance to indicate a preference of which aspects of network performance are most important subjectively to the end user.

The profile 150 can be applied to the target network 110 and a test suite 120 coupled to the target network 110 can conduct a series of tests on live traffic in the target network 110 to determine the performance of the target network 110 as configured according to the profile 150. Thereafter, the results 160 of the tests can be provided to the profile generation and combined with the weighted performance criteria to produce an iteratively refined set of network configuration parameters in a profile 150. Again, the profile 150 can be applied to the target network 110 and the process can begin anew.

Notably, the generation of the profile can result from the execution of a simulated annealing algorithm. In this regard, the simulated annealing algorithm can compute different energy states for the observed performance of the target network 110, each of the energy states further accounting for the weighted performance criteria 140 specified by the end user. In this regard, each energy state can include a weighted sum of the results of each different test applied to the target network 110 having a configuration set forth according to the parameters of the profile 150. Each different test in turn can correspond to a different one of the weighted performance criteria set forth by the end user.

Figure 2:
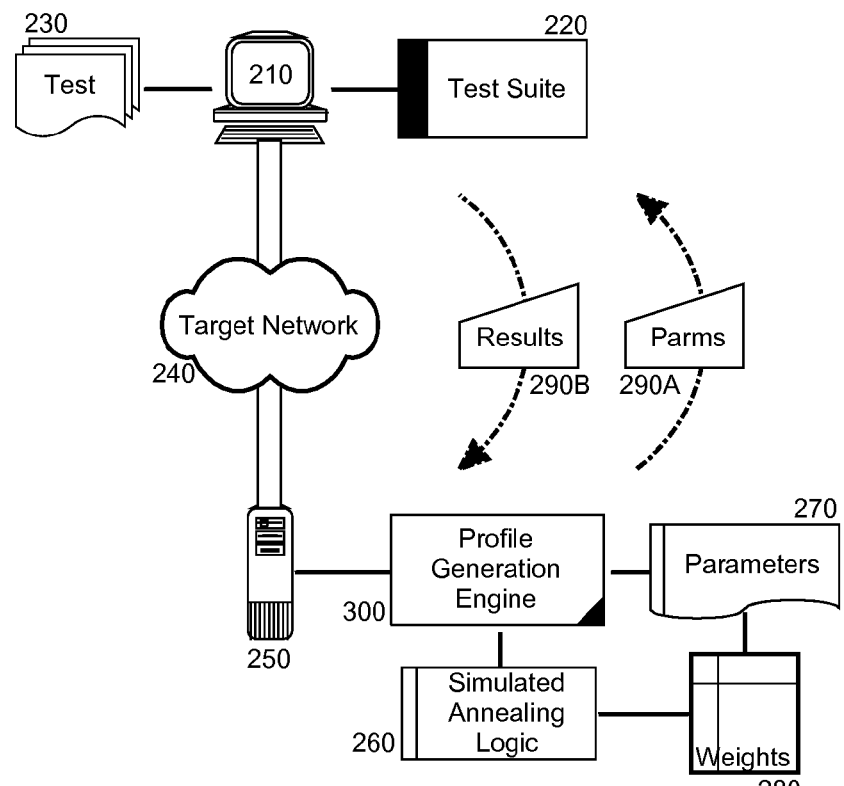
FIG. 2 is a schematic illustration of a data processing system configured for user guided generation of network link optimization profiles; and, FIG. 3 is a flow chart illustrating a process for user guided generation of network link optimization profiles.

In more particular illustration, FIG. 2 is a schematic illustration of a data processing system configured for user guided generation of network link optimization profiles. The system can include a test device 210 coupled to a target network 240 and communicatively linked to a profile generation host 250 over the target network 240. The test device 210 can include a test suite 220 programmed to test the target network 240 according to one or more tests 230, each of the tests 230 addressing different network performance criteria. The profile generation host 250, by comparison, can host the operation of a profile generation engine 300 providing network configuration parameters 270 to configure the target network 240 according to user preferences for network performance criteria, and to interoperate with the test suite 220 to iteratively test the target network 240.

Simulated annealing logic 260 can be coupled to the profile generation engine 300. The simulated annealing logic 260 can include program code enabled to generate optimal network configuration parameters 290A according to results 290B provided by a prior iteration of the tests 230 and weights 280 for network performance criteria. Specifically, an energy function can be implemented by the program code of the simulated annealing logic 260 according to $$E(s)=w(c1)*C1(s)+w(c2)*C2(s)+\ldots+w(cN)*CN(s)$$

for N test results 290B for N corresponding network performance criterion, each being weighted by an end user based upon a specified end user ranking of the network performance criterion.

Figure 3:
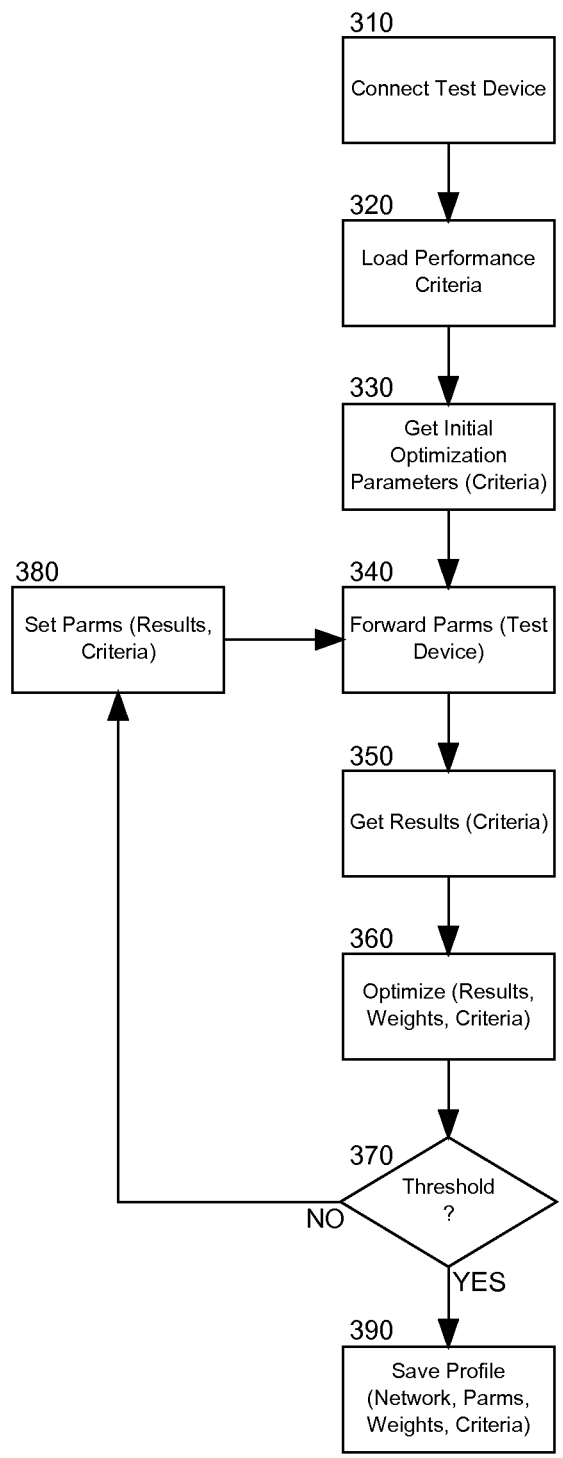

In illustration of the operation of the profile generation engine 300, FIG. 3 is a flow chart illustrating a process for user guided generation of network link optimization profiles. Beginning in block 310, a test device can be connected to the target network. In block 320, rankings for performance criteria for the target network can be loaded reflecting an end user preference of which performance criterion are more or less important than other performance criterion. In block 330, initial optimization parameters for the target network can be determined based upon the ranked performance criterion. Thereafter, the parameters in the form of a profile can be applied to the test device in block 340 and the test device can execute a series of performance tests on the target network using live traffic flowing over the target network. Each test can target a different performance criterion.

In block 350, the results of the tests can be received from the test device according to the different performance criterion. Subsequently, in block 360 a new set of optimization parameters can be computed using simulated annealing according to the received results weighted by the different rankings for the different performance criterion. In decision block 370, if a threshold number of iterations have not yet been surpassed, in block 380 the new set of optimization parameters can be applied to the target network in the form of a profile and the process can continue through block 340. In decision block 370, when a threshold number of iterations have come to pass, in block 390 the converged, final set of optimization parameters can be stored as a profile for the target network.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A network optimization profile generation method comprising:
    ranking different performance criterion for a target network;
    end user assigning weights in respect to prioritized network performance criteria;
    testing the target network for the different performance criterion;
    weighting results of the testing according to the end user assigned weights;
    generating a set of target network configuration parameters through optimization of the weighted results; and,
    applying the set of target network configuration parameters to the target network as a profile.

2. The method of claim 1, further comprising:
    repeating the testing of the target network subsequent to applying the set of target network configuration parameters;
    weighting the results of the testing according to the ranking of the different performance criterion;
    generating a new set of target network configuration parameters through optimization of the weighted results; and,
    applying the new set of target network configuration parameters to the target network as a profile.

3. The method of claim 2, further comprising continuing to perform testing of the target network, to weight results of the testing, to generate new sets of target network configuration parameters, and to apply the new sets of target network configuration parameters in order to converge on an optimized profile for the target network considering the rankings of the different performance criterion.

4. The method of claim 2, further comprising continuing for a threshold number of iterations to perform testing of the target network, to weight results of the testing, to generate new sets of target network configuration parameters, and to apply the new sets of target network configuration parameters in order to converge on an optimized profile for the target network considering the rankings of the different performance criterion.

5. The method of claim 1, wherein testing the target network for the different performance criterion, comprises:
    attaching a test device to the target network;
    executing a plurality of tests for the different performance criterion in a test suite for the test device on live network traffic in the target network; and,
    transmitting results of the tests to a profile generation engine communicatively coupled over a computer communications network.

6. The method of claim 1, wherein generating a new set of target network configuration parameters through optimization of the weighted results, comprises generating a new set of target network configuration parameters through simulated annealing of the weighted results.

7. The method of claim 6, wherein generating a new set of target network configuration parameters through optimization of the weighted results, comprises generating a new set of target network configuration parameters through simulated annealing of the weighted results utilizing an energy function defined as $E(s)=w(c1)*C1(s)+w(c2)*C2(s)+ \ldots +w(cN)*CN(s)$ for N ones of the weighted results.

8. A network optimization profile generation data processing system comprising:
    a test device configured for coupling to a target network, the test device comprising a test suite and a plurality of tests each directed to a different network performance criterion for the target network;
    a profile generation engine configured for communicative coupling to the test device over the target network, the engine comprising program code enabled to iteratively apply a profile of network configuration parameters to the target network, to signal the test device to initiate testing of the target network, and to receive test results from the test device; and,
    simulated annealing logic coupled to the profile generation engine, the logic comprising program code enabled to generating a profile of network configuration parameters through simulated annealing of weighted ones of the test results, the simulated annealing logic generating the profile by accepting user assigned weights and applying the user assigned weights to the network performance criterion for use during simulated annealing.

9. The system of claim 8, wherein the simulated annealing of the weighted ones of the test results comprises a simulated annealing of the weighted ones of the test results utilizing an energy function defined as $E(s)=w(c1)*C1(s)+w(c2)*C2(s)+ \ldots +w(cN)*CN(s)$ for N ones of the weighted results.

10. A computer program product comprising a computer usable storage medium comprising a memory device storing computer usable program code for network optimization profile generation, the computer program product comprising:
    computer usable program code for ranking different performance criterion for a target network;
    computer usable program code for end user assigning weights in respect to prioritized network performance criteria;
    computer usable program code for testing the target network for the different performance criterion;
    computer usable program code for weighting results of the testing according to the end user assigned weights;
    computer usable program code for generating a set of target network configuration parameters through optimization of the weighted results; and,
    computer usable program code for applying the set of target network configuration parameters to the target network as a profile.

11. The computer program product of claim 8, further comprising:
    computer usable program code for repeating the testing of the target network subsequent to applying the set of target network configuration parameters;
    computer usable program code for weighting the results of the testing according to the ranking of the different performance criterion;
    computer usable program code for generating a new set of target network configuration parameters through optimization of the weighted results; and,
    computer usable program code for applying the new set of target network configuration parameters to the target network as a profile.

12. The computer program product of claim 10, further comprising, computer usable program code for continuing to perform testing of the target network, to weight results of the testing, to generate new sets of target network configuration parameters, and to apply the new sets of target network configuration parameters in order to converge on an optimized profile for the target network considering the rankings of the different performance criterion.

13. The computer program product of claim 10, further comprising, computer usable program code for continuing for a threshold number of iterations to perform testing of the target network, to weight results of the testing, to generate new sets of target network configuration parameters, and to apply the new sets of target network configuration parameters in order to converge on an optimized profile for the target network considering the rankings of the different performance criterion.

14. The computer program product of claim 10, wherein the computer usable program code for testing the target network for the different performance criterion, comprises:
    computer usable program code for attaching a test device to the target network;
    computer usable program code for executing a plurality of tests for the different performance criterion in a test suite for the test device on live network traffic in the target network; and,
    computer usable program code for transmitting results of the tests to a profile generation engine communicatively coupled over a computer communications network.

15. The computer program product of claim 14, wherein the computer usable program code for generating a new set of target network configuration parameters through simulated annealing of the weighted results, comprises computer usable program code for generating a new set of target network configuration parameters through simulated annealing of the weighted results utilizing an energy function defined as $E(s)=w(c1)*C1(s)+w(c2)*C2(s)+ \ldots +w(cN)*CN(s)$ for N ones of the weighted results.

16. The computer program product of claim 10, wherein the computer usable program code for generating a new set of target network configuration parameters through optimization of the weighted results, comprises computer usable program code for generating a new set of target network configuration parameters through simulated annealing of the weighted results.

* * * * *